(12) United States Patent  
Horng

(10) Patent No.: US 6,462,443 B2
(45) Date of Patent: Oct. 8, 2002

(54) BRUSHLESS D.C. MOTORS STRUCTURE

(75) Inventor: Alex Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 09/761,712

(22) Filed: Jan. 18, 2001

(51) Int. Cl.[7] .......................... H02K 11/00; H02K 5/00; H02K 1/06
(52) U.S. Cl. ..................... 310/68 B; 310/89; 310/67 R; 310/194
(58) Field of Search .............................. 310/68 R, 67 R, 310/254, 258, 268, 42, 71, 194; 360/99.08, 98.07, 97.03; 29/596–598

(56) References Cited

U.S. PATENT DOCUMENTS

| | | | |
|---|---|---|---|
| 4,554,491 A | * 11/1985 | Plunkett | 310/68 R |
| 4,806,808 A | * 2/1989 | Grecksch et al. | 310/71 |
| 5,155,401 A | * 10/1992 | Kanaya et al. | 310/89 |
| 5,617,241 A | * 4/1997 | Kitazawa | 310/177 |
| 5,808,390 A | * 9/1998 | Miyazawa et al. | 310/194 |
| 5,952,751 A | * 9/1999 | Yamakoshi et al. | 310/89 |
| 6,281,609 B1 | * 8/2001 | Itami et al. | 310/68 B |

* cited by examiner

Primary Examiner—Tran Nguyen
(74) Attorney, Agent, or Firm—Bacon & Thomas

(57) ABSTRACT

A brushless D.C. motor comprises a stator, a rotor, and a drive device. An axle tube is extended through the stator and includes a bearing mounted therein for rotatably holding a shaft of the rotor. The drive device detects polarity of a ring magnet of the rotor and drives the rotor to rotate. The drive device is fixed to a stator bobbin or fixed at a position below the ring magnet.

12 Claims, 8 Drawing Sheets

US 6,462,443 B2

BRUSHLESS D.C. MOTORS STRUCTURE

BACKGROUND OF THE INVENTION

1. Field of the Invention

The present invention relates to brushless direct current (D.C.) motors with a smaller thickness.

2. Description of the Related Art

FIGS. 1 and 2 illustrate a conventional brushless motor that acts as a heat-dissipating fan. Heat-dissipating fans are widely used for electric elements and central processors that generate heat when operating. In order to be utilized in a limited space, it is a trend to minimize the thickness and volume of the fans so as to provide wider applications.

As illustrated in FIGS. 1 and 2, the conventional D.C. motor type heat-dissipating fan 9 includes a housing 91 with an axle tube 92 mounted thereto. A stator bobbin 93 and a circuit board 96 are mounted around the axle tube 92. The stator bobbin has been wound with coils and includes an upper polar plate 94 and lower polar plate 95. A shaft 98 of a rotor 97 is rotatably held by the axle tube 92. Such a D.C. motor type heat-dissipating fan 9 has a certain thickness. It is, therefore, relatively difficult for manufacturers to reduce the thickness of the D.C. motor heat-dissipating fan with currently necessary members.

In the conventional D.C. motor type heat-dissipating fan 9, the circuit board 96 includes at least a Hall sensor and a drive circuit, wherein the drive circuit consists of at least two transistors and necessary electronic elements. The Hall sensor is used to detect the polarity of the ring magnet of the rotor, and the rotor is driven by the drive circuit to turn. Thus, the elements on the circuit board 96 are not omittable in conventional D.C. motor type heat dissipating fans. Nevertheless, it would be of great help in reducing the thickness of the motors if the space occupied by the circuit board could be reduced without adversely affecting the functions of the motors.

SUMMARY OF THE INVENTION

It is the primary object of the present invention to provide an improved brushless D.C. motor structure with minimized volume and thickness by reducing elements on the circuit board while maintaining original functions of the brushless D.C. motor.

It is another object of the present invention to provide an improved brushless D.C. motor structure that can be easily manufactured and assembled by reducing elements on the circuit board while maintaining original functions of the brushless D.C. motor.

A brushless D.C. motor in accordance with the present invention comprises a stator, a rotor, and a drive means. An axle tube is extended through the stator and includes a bearing mounted therein for rotatably holding a shaft of the rotor. The drive means detects polarity of a ring magnet of the rotor and drives the rotor to turn. The drive means is fixed to a stator bobbin or fixed at a position below the ring magnet.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Preferred embodiments in accordance with the present invention will now be described with reference to the accompanying drawings.

Figure 1:
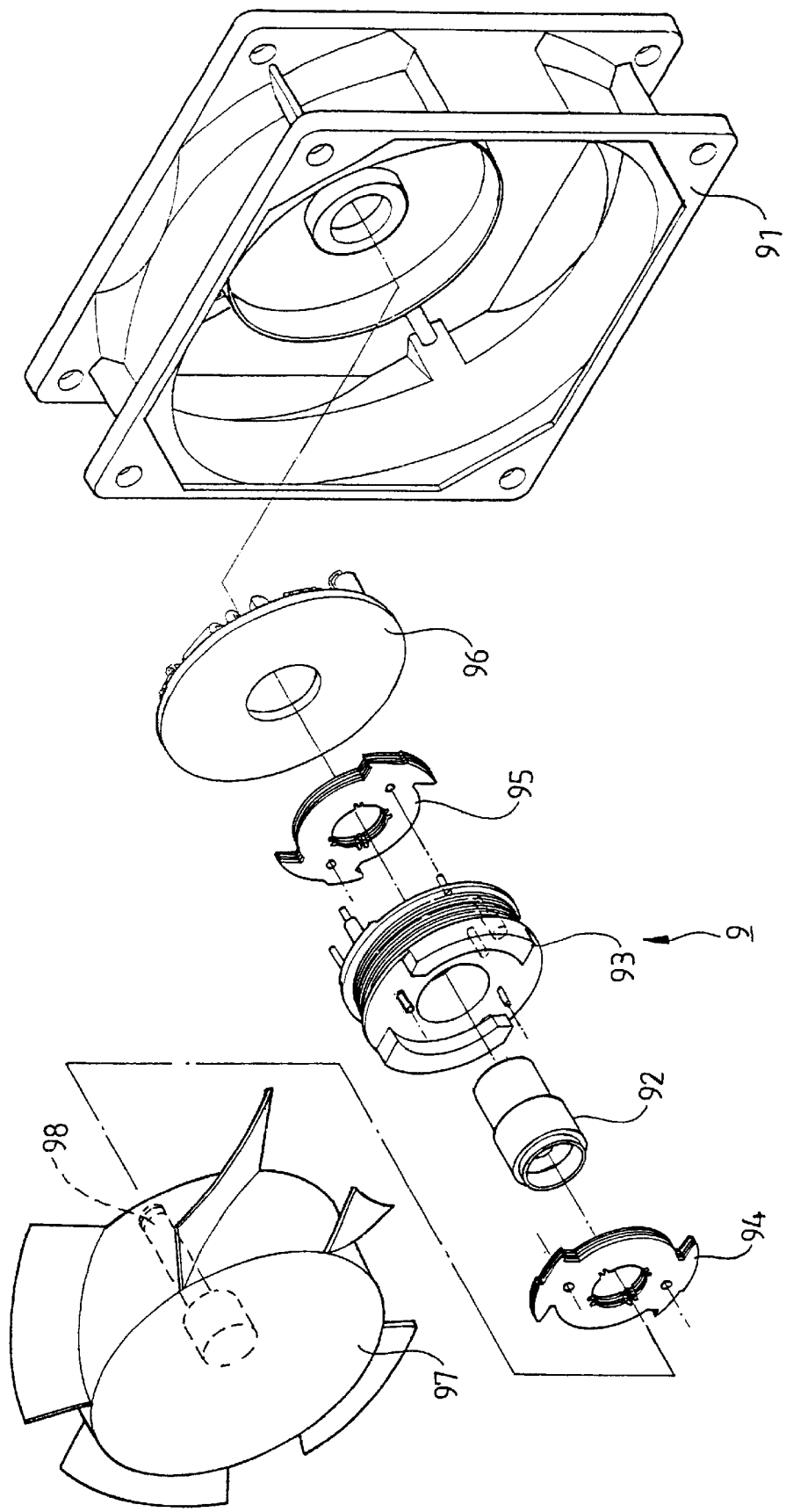
FIG. 1 is an exploded perspective view of a conventional brushless D.C. motor.
Figure 2:
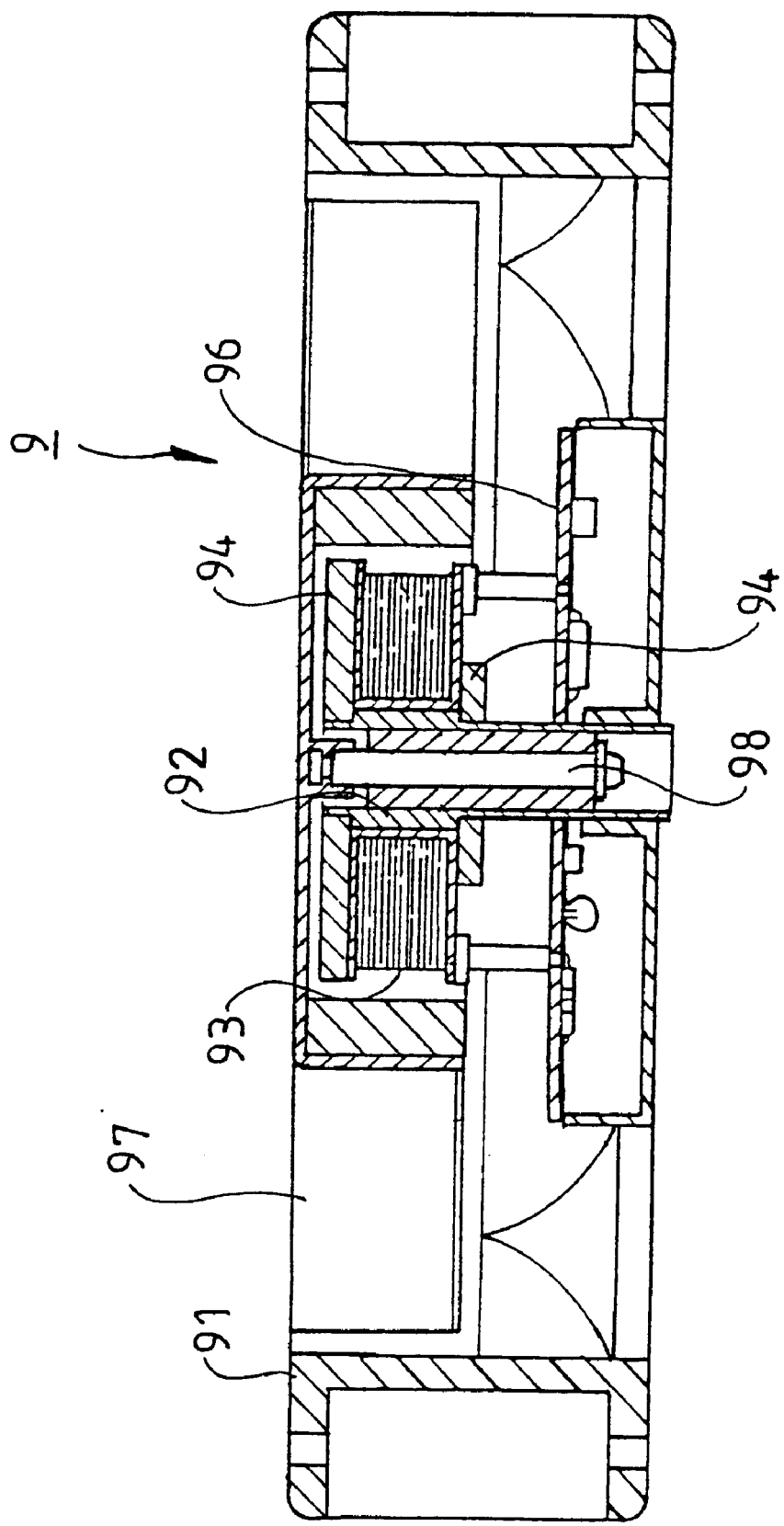
FIG. 2 is a sectional view of the conventional brushless D.C. motor.
Figure 3:
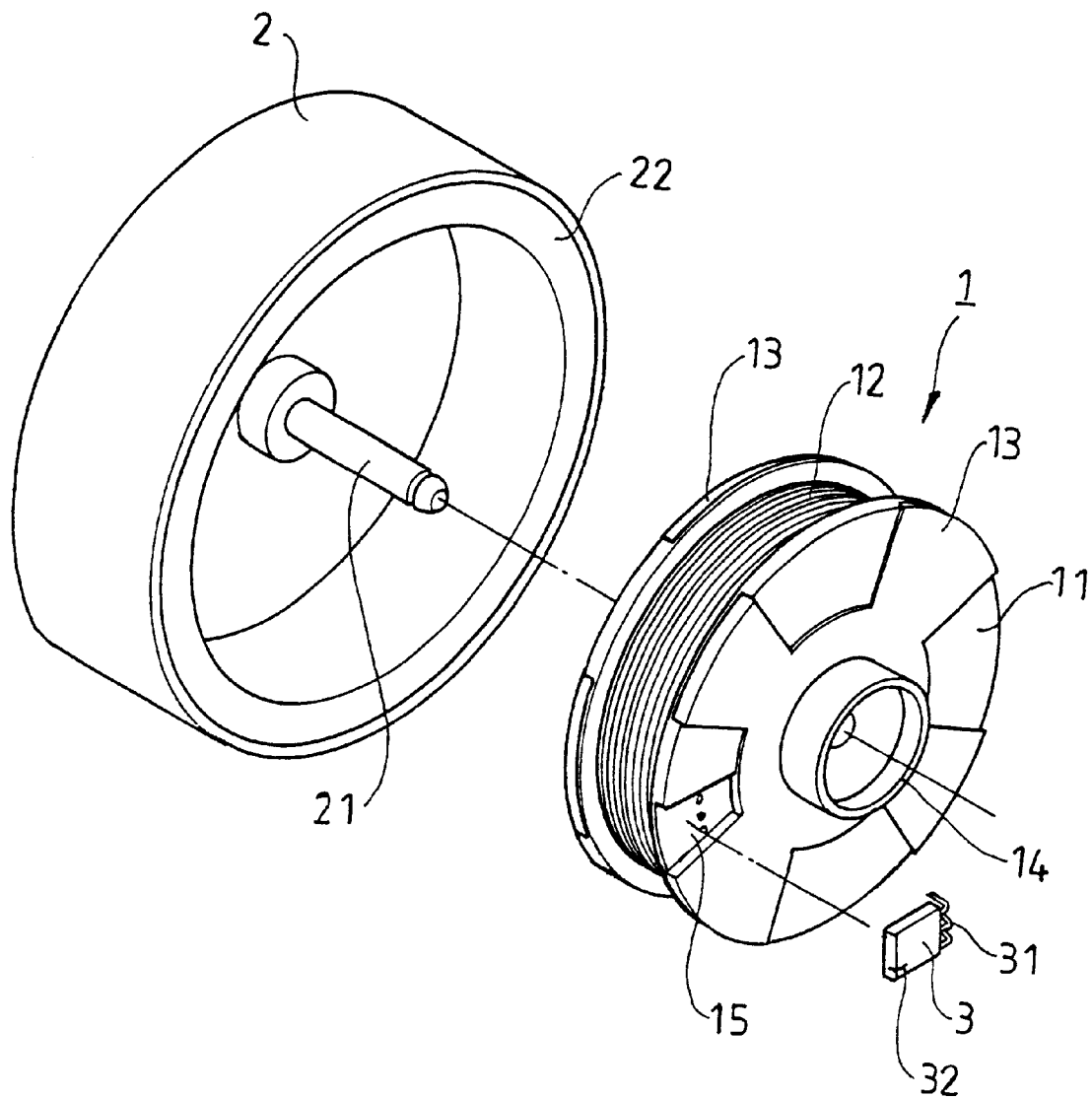
FIG. 3 is an exploded perspective view of a first embodiment of a brushless D.C. motor in accordance with the present invention.

Referring to FIG. 3, a first embodiment of a brushless direct current (D.C.) motor in accordance with the present invention generally includes a stator 1, a rotor 2, and a drive means 3. The stator 1 comprises a stator bobbin 11 having a winding 12 wound therearound. An axle tube 14 is provided to engage the stator bobbin 1 with upper and lower pole plates 13.

The rotor 2 includes a shaft 21 that is rotatably received in the axle tube 14 of the stator 1. The rotor 2 includes a ring magnet 22 with north pole and south pole. The ring magnet 22 surrounds the stator bobbin 11 such that the rotor 2 may inductively couple with the stator 1 and thus rotate around the stator 1.

The drive means 3 includes a sensing element and a drive circuit that are packaged together to form a single member. The drive means 3 includes pins 31 for transmission of signals and electrical connection with the winding 12 of the stator 1. In a preferred embodiment, the drive means 3 may include a mark 32 on an outer surface thereof to indicate the best sensing point for the drive means 3. In this embodiment, the drive means 3 is fixed to the stator bobbin 11 of the stator 1. In addition the stator bobbin 11 includes a recess 15 for completely or partially receiving the drive means 3. Thus, the brushless D.C. motor has a minimized thickness after assembly.

Figure 4:
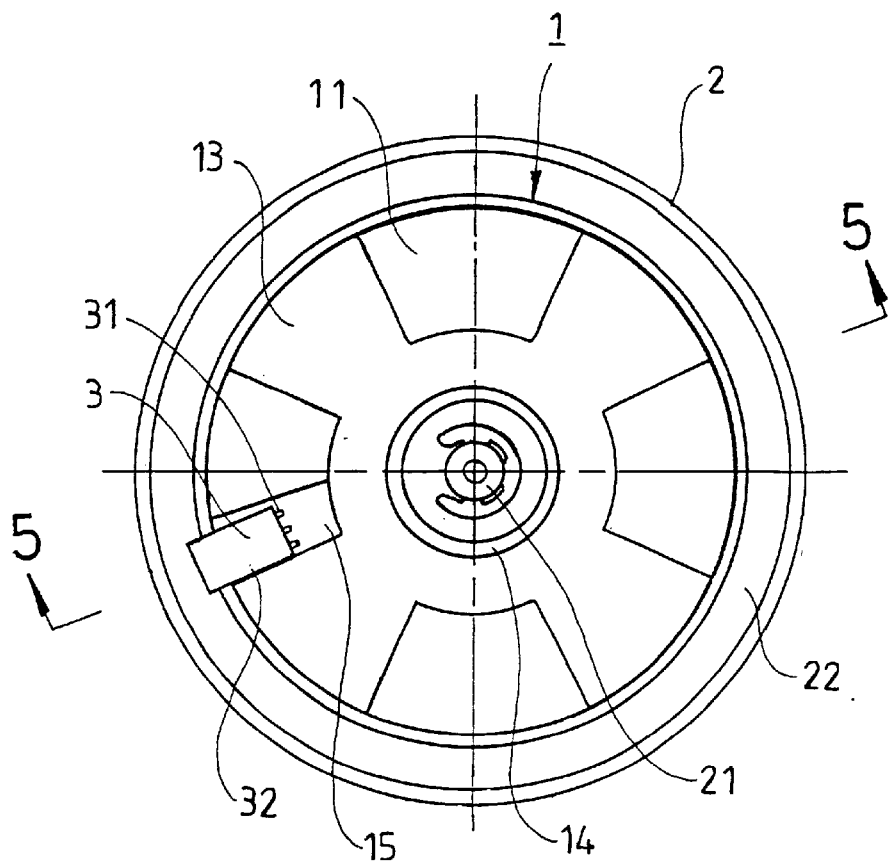
FIG. 4 is a bottom view of the first embodiment of the brushless D.C. motor in accordance with the present invention.
Figure 5:
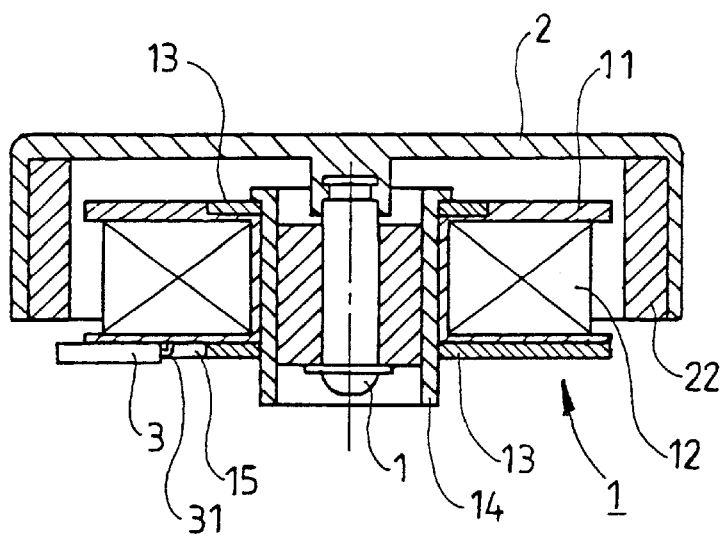
FIG. 5 is a sectional view taken along line 5–5 in FIG. 4.

FIG. 4 is a bottom view of the first embodiment of the brushless D.C. motor in accordance with the present invention. FIG. 5 is a sectional view taken along line 5–5 in FIG. 4, illustrating assembly of the motor. The shaft 21 of the rotor 2 is rotatably received in the axle tube 14 of the stator 1. As the stator bobbin 11 is made from insulating material, the drive means 3 may proceed with transmission of correct signals. And the drive means 3 does not increase the overall thickness and volume of the rotor.

Figure 6:
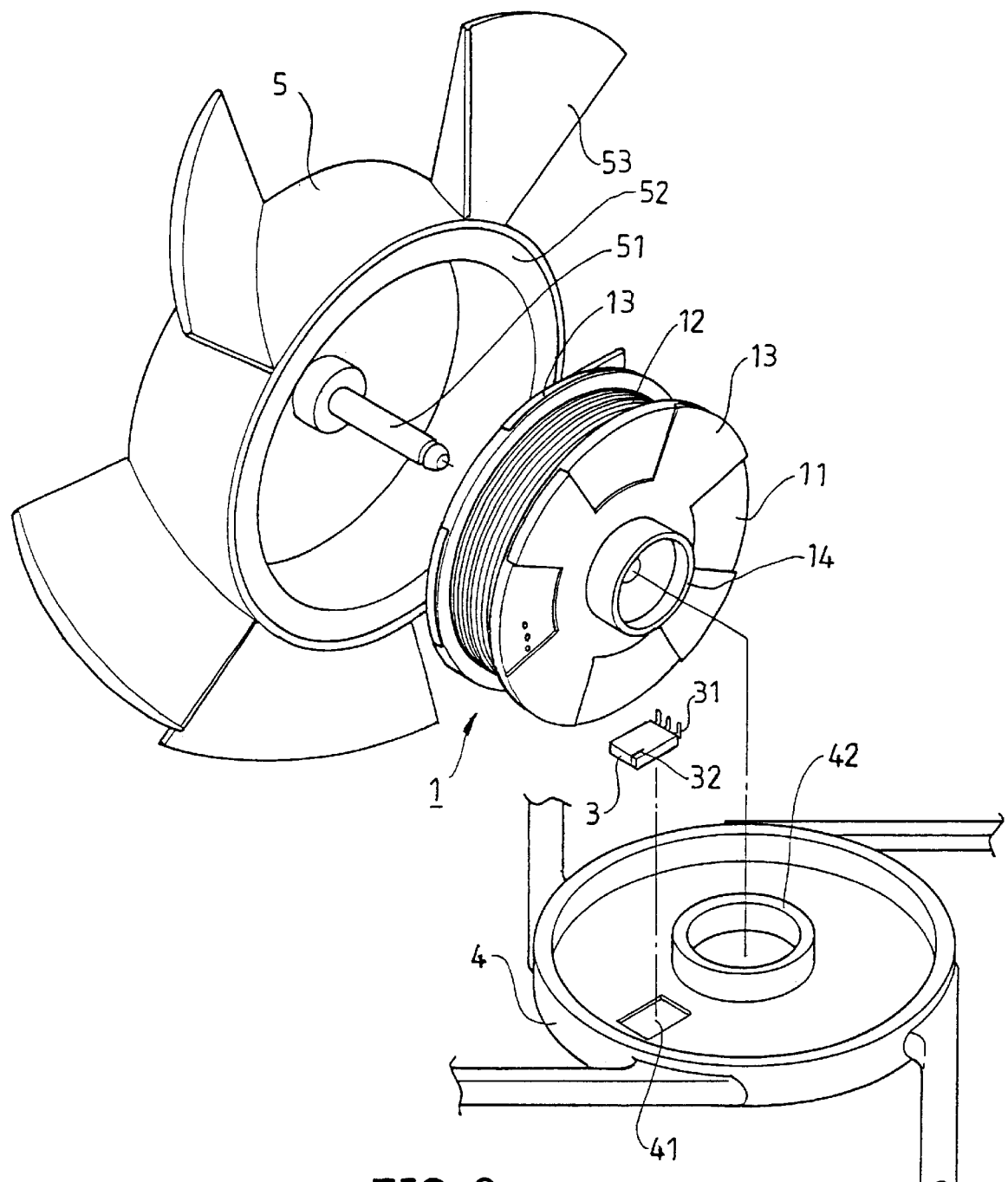
FIG. 6 is an exploded perspective view of a second embodiment of the brushless D.C. motor in accordance with the present invention.
Figure 7:
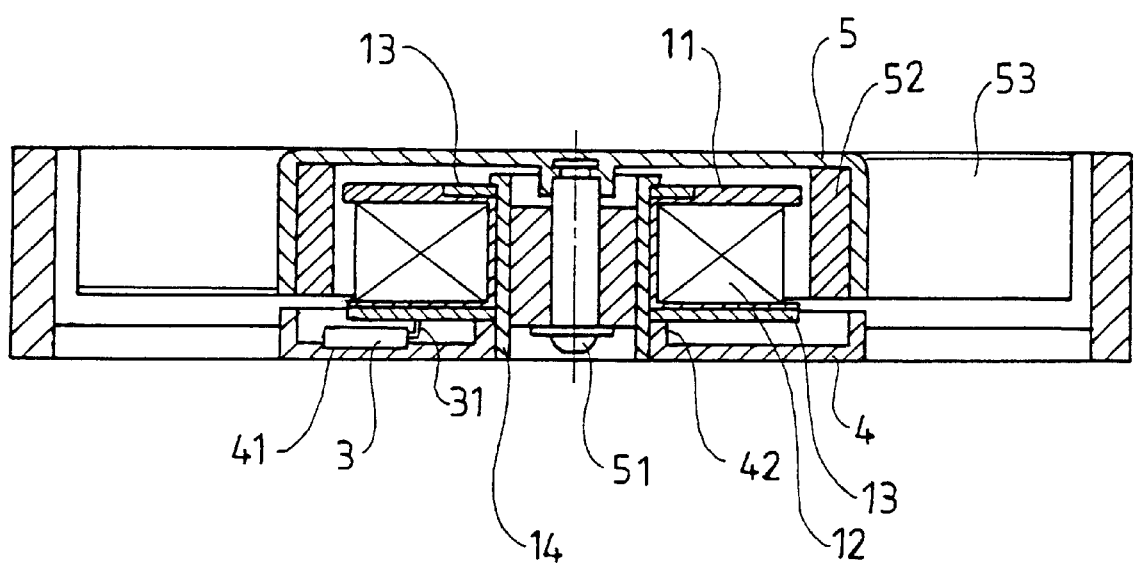
FIG. 7 is a sectional view of the second embodiment of the brushless D.C. motor in accordance with the present invention.

FIG. 6 illustrates a second embodiment of the brushless D.C. motor in accordance with the present invention. The brushless D.C. motor comprises a housing 4 with an axle seat 42 for engaging with the axle tube 14 of the stator 1. The axle tube 14 rotatably receives the shaft 51 of the rotor 5 that includes a ring magnet 52 and fan blades 53. The drive means 3 is fixed to the housing 4 made from insulating material. Thus, a heating-dissipating fan with a brushless D.C. motor is provided. The housing 4 may further include a recess 41 for receiving the drive means 3. Thus, the heat-dissipating fan has a minimized thickness (height) after assembly, best shown in FIG. 7.

Figure 8:
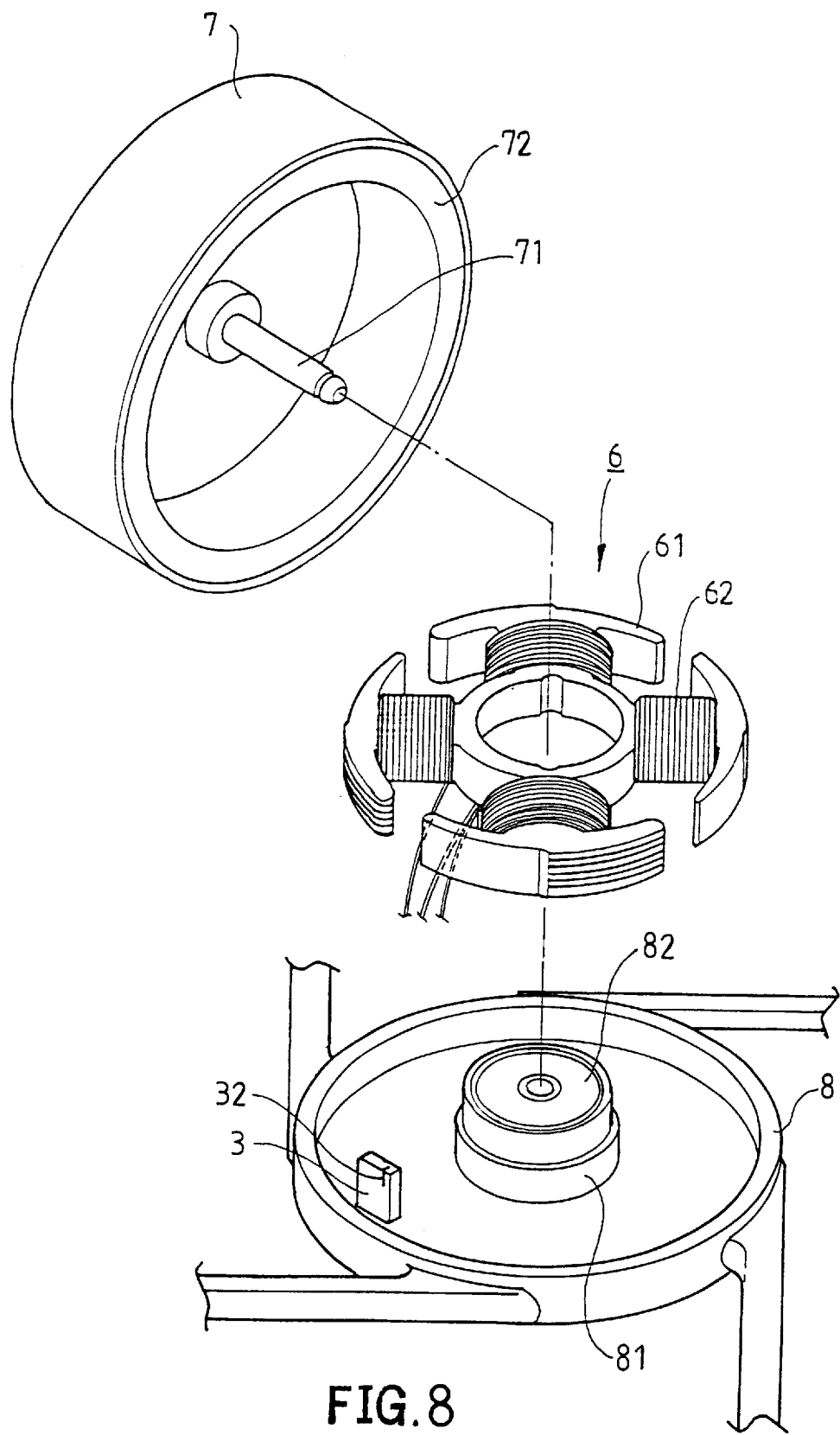
FIG. 8 is an exploded perspective view of a third embodiment of the brushless D.C. motor in accordance with the present invention.

FIG. 8 illustrates a third embodiment of the brushless D.C. motor in accordance with the present invention. The brushless D.C. motor includes a stator 6, a rotor 7, a base 8, and a drive means 3.

The stator 6 includes a plurality of silicon steel plates laminated to form a plurality of even-numbered pole arms 61 with radial winding 62 wound therearound. The stator 6 is mounted around an axle seat 81 on the base 8. The axle seat 81 includes a bearing 82 mounted therein for rotatably holding a shaft 71 of the rotor 7. The rotor 7 includes a ring magnet 72 with north pole and south pole. The ring magnet 72 surrounds the stator 6 such that the rotor 7 may have induction with the stator 6 and thus rotate around the stator 6.

The drive means 3 is directly mounted on the base 8. Preferably, the drive means 3 is located in a peripheral area of the stator 6 and between two pole arms 61. The drive means 3 detects change in the polarity of the rotor 7 and drives the rotor 7 to rotate.

Figure 9:
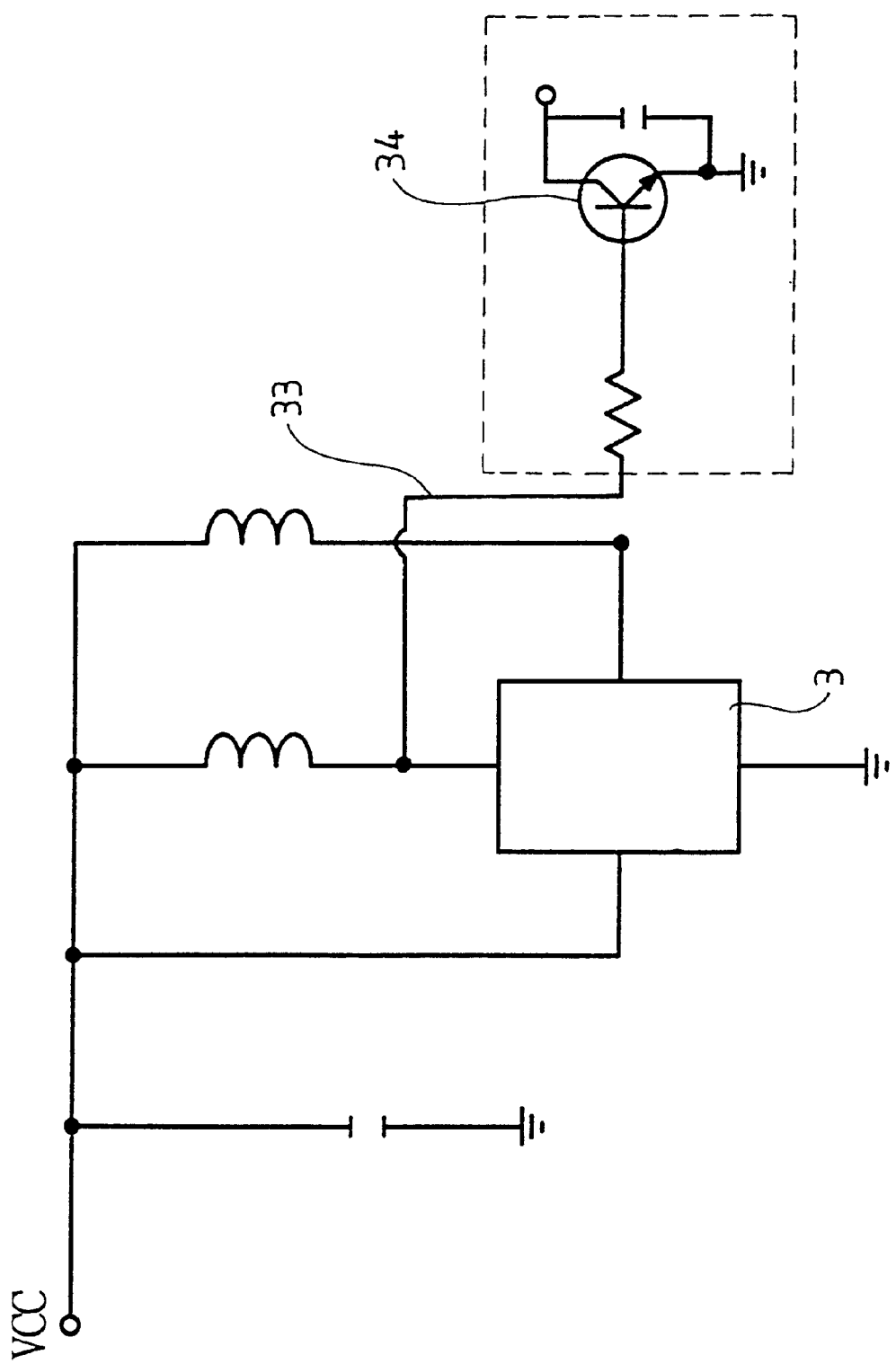
FIG. 9 is a diagram illustrating a drive circuit in accordance with the present invention.

FIG. 9 illustrates a control drive circuit in accordance with the present invention. The drive means 3 includes at least four pins, wherein two of the pins are connected with the stator winding, one of the remaining two pins is used for grounding, and the other one of the remaining two pins is used for electrical connections with a power source. One of the two pins for connecting with the stator winding is led out to form a detecting line 33. Signals from the detecting line 33 can be amplified by at least one transistor 34 for detecting and controlling rotational speed of the motor or for indicating malfunction of the motor.

The preferred embodiment of the invention, as described above, have the advantage that because the drive circuit and the Hall sensor are combined into a single drive means, the overall thickness of the brushless D.C. motor is relatively small and the motor is thus easier to manufacture.

In addition, because the drive means is received in a recess in the stator bobbin, the thickness of the whole brushless D.C. motor can be further reduced. Other advantages of the invention include direct and convenient mounting of the drive means at any desired position, simplified wire connections between the motor and the drive circuit, and the ability to conveniently lead out a detecting wire for detecting rotation or indicating malfunction of the motor. While the invention is not limited to a particular type of D.C. motor, the above-described advantages are particularly applicable to D.C. motors with radial windings, and/or to D.C. motors for heat-dissipating fans in which fan blades are formed on the rotor.

In accordance with the structure recited in claim 5 of the present invention, the brushless D.C. motor can be fixed on a housing such that the brushless D.C. motor can be easily assembled and used while maintaining a smaller thickness.

In accordance with the structure recited in claim 6 of the present invention, the brushless D.C. motor, when mounted to a housing, has a minimized thickness in addition to the advantage of easier assembly and use.

In accordance with the structure recited in claim 9 of the present invention, the rotor forms a heat-dissipating fan when the rotor includes fan blades formed thereon, so as to be used in a smaller space for dissipating heat.

In accordance with the structure recited in claim 10 of the present invention, a brushless D.C. motor with radial winding in the stator is provided to have a smaller thickness.

In accordance with the structures recited in claims 3, 7, and 11 of the present invention, the drive means is directly and conveniently mounted to any desired position. The wire connection for the control drive circuit for the brushless D.C. motor is simplified to thereby provide a brushless D.C. motor with a smaller thickness.

In accordance with the structures recited in claims 4, 8, and 12 of the present invention, a detecting wire can be conveniently led out for detecting rotation or indicating malfunction of the motor.

In accordance with the structure recited in claim 13 of the present invention, the stator winding is radial to provide a brushless D.C. motor with a smaller thickness.

In accordance with the structure recited in claim 14 of the present invention, in a heat dissipating fan with a brushless D.C. motor, the heat-dissipating fan has a smaller thickness when the stator winding is radial.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A brushless D.C. motor comprising:
   a stator including a stator bobbin, an upper pole plate, a lower pole plate, and a winding that are engaged together by an axle tube, the stator bobbin including a recess;
   a rotor comprising a shaft that is rotatably received in the axle tube of the stator, the rotor including a ring magnet that surrounds the stator; and
   a drive means mounted in said recess of the stator bobbin of the stator, the drive means including a drive circuit and a sensing element packaged together as a single member.

2. The brushless D.C. motor as claimed in claim 1, wherein the drive means includes at least four pins, two of the pins being electrically connected to the winding of the stator, another said pin being connected to a power source, and the remaining pin being grounded.

3. The brushless D.C. motor as claimed in claim 2, wherein one of the two pins electrically connected to the winding of the stator is led out to form a detecting line.

4. A brushless D.C. motor comprising:
   a stator including an upper pole plate, a lower pole plate, and a winding that are engaged together by an axle tube;
   a rotor comprising a shaft that is rotatably received in the axle tube of the stator, the rotor including a ring magnet that surrounds the stator;
   a housing including an axle seat for engaging with the axle tube of the stator, the housing including a recess; and
   a drive means mounted in said recess of the housing, the drive means including a drive circuit and a sensing element packaged together as a single member.

5. The brushless D.C. motor as claimed in claim 4, wherein the drive means includes at least four pins, two of the pins being electrically connected to the winding of the stator, another said pin being connected to a power source, and the remaining pin being grounded.

6. The brushless D.C. motor as claimed in claim 5, wherein one of the two pins electrically connected to the winding of the stator is led out to form a detecting line.

7. The brushless D.C. motor as claimed in claim 4, wherein the rotor includes fan blades.

8. A brushless D.C. motor comprising:
   a base including a recess and an axle seat, the axle seat having a bearing mounted therein;
   a stator mounted to the axle seat of the based, the stator including a plurality of even numbered pole arms and a winding wound around the pole arms;
   a rotor comprising a shaft that is rotatably received in the bearing of the base, the rotor including a ring magnet that surrounds the stator; and
   a drive means mounted in said recess of the base, the drive means including a drive circuit and a sensing element packaged together as a single member.

9. The brushless D.C. motor as claimed in claim 8, wherein the drive means includes at least four pins, two of the pins being electrically connected to the winding of the stator, another said pin being connected to a power source, and the remaining pin being grounded.

10. The brushless D.C. motor as claimed in claim 9, wherein one of the two pins electrically connected to the winding of the stator is led out to form a detecting line.

11. The brushless D.C. motor as claimed in claim 8, wherein the drive means is mounted on the base and between two said pole arms of the stator.

12. The brushless D.C. motor as claimed in claim 8, wherein the rotor includes fan blades.

* * * * *